United States Patent [19]
Asai

[11] Patent Number: 5,738,886
[45] Date of Patent: Apr. 14, 1998

[54] MOLD FOR DISK SUBSTRATE

[75] Inventor: Ikuo Asai, Nagoya, Japan

[73] Assignee: Kabushiki Kaisha Meiki Seisakusho, Japan

[21] Appl. No.: 691,595

[22] Filed: Aug. 2, 1996

[30] Foreign Application Priority Data

Aug. 7, 1995 [JP] Japan .................. 7-200128

[51] Int. Cl.⁶ .................. B29C 45/38; B29C 45/40
[52] U.S. Cl. .................. 425/556; 425/577; 425/536 R; 425/436 RM; 425/444; 425/810; 264/107
[58] Field of Search .................. 425/186, 192 R, 425/556, 810, 577, 444, 436 RM, 436 R; 264/107

[56] References Cited

U.S. PATENT DOCUMENTS

| | | | |
|---|---|---|---|
| 4,737,096 | 4/1988 | Poorten. | |
| 4,961,884 | 10/1990 | Watanabe et al. | 425/810 |
| 5,460,763 | 10/1995 | Asai | 425/810 |
| 5,545,365 | 8/1996 | Asai | 264/106 |
| 5,552,098 | 9/1996 | Kudo et al. | 425/810 |
| 5,593,710 | 1/1997 | Asai | 425/552 |
| 5,607,705 | 3/1997 | Asai | 425/190 |

FOREIGN PATENT DOCUMENTS 63-237921  10/1988  Japan .................. 425/810

*Primary Examiner*—Khanh P. Nguyen
*Attorney, Agent, or Firm*—Parkhurst & Wendel, L.L.P.

[57] ABSTRACT

A mold for molding a substrate of a disk, including a stationary and a movable mold half which are movable relatively to each other, a positioning ring portion on the movable mold half, for positioning an annular stamper at its center hole, and an ejector sleeve located radially inwardly of the positioning ring portion and movable to remove the substrate from the movable mold half. The ejector sleeve includes a recessing end portion which extends in an axial direction thereof beyond an end face of the positioning ring portion into the mold cavity when the stationary and movable mold halves are placed in the closed position. The recessing end portion has an outer circumferential surface which is perpendicular to the end face of the positioning ring portion, so that an annular recess partly defined by a circumferential shoulder surface is formed by the recessing end portion of the ejector sleeve. The circumferential shoulder surface is formed by the outer circumferential surface of the recessing end portion.

10 Claims, 8 Drawing Sheets

MOLD FOR DISK SUBSTRATE

BACKGROUND OF THE INVENTION

1. Field of the Invention

The present invention relates in general to techniques associated with a disk substrate which is used for producing an optical disk, a magneto-optic disk, or the like. More particular, this invention is concerned with a substrate which is provided with suitable means for facilitating subsequent processing to obtain a high quality disk, and a mold for molding such a disk substrate.

2. Discussion of the Related Art

There have recently been used optical disks (including magneto-optic disks) as a data storage medium in various fields of the art such as an audio system, a video system and a computer system. These disks are produced by a known mold, for example, by using a mold consisting of a stationary mold half and a movable mold half, both of which have respective mold surfaces cooperating to define therebetween a mold cavity in which an annular stamper is fixed for molding a disk substrate. The annular stamper is an annular thin plate which is positioned and set on the movable mold half and which has a molding surface for forming a signal area on an information-bearing surface of the disk substrate. Then, the stationary and movable mold halves are brought to a closed position to define the mold cavity, and a material of the disk substrate is injected into the mold cavity. As a result, the disk substrate is molded such that information stored on the stamper is reproduced or copied on the signal area of the formed disk substrate. The stamper has information in the form of pits, or alternatively grooves for forming recording trucks on the disk substrate. Then, a reflector film or a recording film made of pure aluminum or gold having a relatively small thickness is formed on the surface of the signal area of the substrate by vapor deposition or sputtering. Then, a protective film made of a synthetic resin having a relatively small thickness is formed on the formed reflector film so as to prevent oxidization and corrosion of the reflector film. The stamper is generally positioned on the mold surface of the movable mold half such that the stamper is fitted at its center bore on the outer circumferential surface of a suitable positioning portion of the movable mold half.

The protective film is formed on the disk substrate in the following method, for example. First, the disk substrate is placed on a rotating table of a spin-coating device which is rotatable about a vertical axis. Then, an appropriate material for forming the protective film, such as a synthetic resin, is placed in radially inner portion of a surface of the disk substrate. Subsequently, the rotating table is rotated so that the material of the protective film is spread radially outwardly by a centrifugal force generated by the rotation of the table, whereby the disk substrate is covered by the protective film having a small thickness.

However, it is difficult to control the inner circumferential edge of the protective film, when the protective film is formed according to the above-described method. Namely, some volume of the material of the protective film tends to spread in the radially inward direction such that the inner circumferential edge of the protective film does not have a sufficiently high degree of roundness. Therefore, this leads to deterioration of the appearance and quality of the obtained disk.

SUMMARY OF THE INVENTION

It is therefore a first object of the present invention to provide a substrate of a disk which is provided with suitable means for preventing a radially inward movement of a material of a protective film, so that the protective film has an inner circumferential edge with a high degree of roundness.

A second object of this invention is to provide a mold which is simple in construction and which permits molding of a substrate of a disk which is provided with suitable means for preventing a radially inward movement of a material of a protective film, so that the protective film has an inner circumferential edge with a high degree of roundness.

The first object indicated above may be achieved according to a first aspect of this invention, which provides a substrate of a disk, which has a surface including a stamper contact area which contacts a stamper during molding of the substrate and which includes a signal area covered by a thin film and a protective film formed on the thin film, wherein an annular recess partly is defined by a circumferential shoulder surface which is spaced a predetermined distance from an inner circumference of the stamper contact area in a radially inward direction of the substrate. The circumferential shoulder surface is perpendicular to a plane of the surface, and the circumferential shoulder surface has a substantially square edge adjacent to the surface.

In the disk substrate constructed according to the present invention, the annular recess has the circumferential shoulder surface which defines the inner circumferential edge of the surface of the disk substrate. When the protective film is formed, an annular mass of the material of the protective film is placed in an annular surface area of the disk substrate which is radially outward of the circumferential shoulder surface of the annular recess. Subsequently, the disk substrate is rotated about its axis (about the center of the annular recess), so that the material is spread radially outwardly on the substrate surface by a centrifugal force, whereby the protective layer is formed on the disk substrate. Since the material of the protective film has a suitable tension and since the inner edge of the substrate is defined by the shoulder surface of the recess, a radially inward movement of the material beyond the inner edge is prevented, so that the formed protective film has an inner circumferential edge having a high degree of roundness. In the disk substrate of this invention, the stamper contact area is an area which contacts the stamper during molding of the substrate, while the signal area is a part of the stamper contact area in which pits or grooves are formed by contact with the molding surface of the stamper.

The second object indicated above may be achieved according to a second aspect of the present invention, which provide a mold for molding a substrate of a disk, the mold having an annular plate-like stamper which has a center hole and which contacts a surface of the substrate, the mold comprising: (a) a stationary mold half having a first mold surface; (b) a movable mold half movable relative to the stationary mold half and having a second mold surface which cooperates with the first mold surface to define therebetween a mold cavity when the stationary movable mold halves are placed in a closed position for molding the substrate; (c) a positioning ring portion provided on the movable mold half, for positioning the annular stamper such that the annular stamper is fitted at the center hole on the positioning ring portion; and (d) an ejector sleeve provided on the movable mold half such that the ejector sleeve is located radially inwardly of the positioning ring portion and is movable so as to protrude from the second mold surface for removing the substrate from the movable mold half. The ejector sleeve includes a recessing end portion which extends in an axial direction thereof beyond an end face of the positioning ring portion into the mold cavity when the stationary and movable mold halves are placed in the closed position. The recessing end portion has an outer circumferential surface which is perpendicular to the end face of the positioning ring portion, so that an annular recess partly defined by a circumferential shoulder surface is formed by the recessing end portion of the ejector sleeve. The circumferential shoulder surface is formed by the outer circumferential surface of the recessing end portion.

The mold constructed according to the present invention is capable of producing a disk substrate wherein the inner circumferential edge is defined by the circumferential shoulder surface of the annular recess. This inner circumferential edge is effective to prevent a movement of the material of the protective film in the radially inward direction.

In the mold for molding the disk substrate of the present invention, especially, the recessing end portion for forming the annular recess in the disk substrate is provided by the ejector sleeve which is required for removing the molded substrate from the mold. Thus, the mold adapted to mold the desired disk substrate having the annular recess does not require any additional parts for forming the annular recess in the substrate.

The axial length of the recessing end portion is determined in view of the fluidity of a resin material to be injected into the mold cavity, and the desired thickness and strength of the disk to be produced. The axial length of the recessing end portion is preferably 0.05 mm–0.4 mm.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
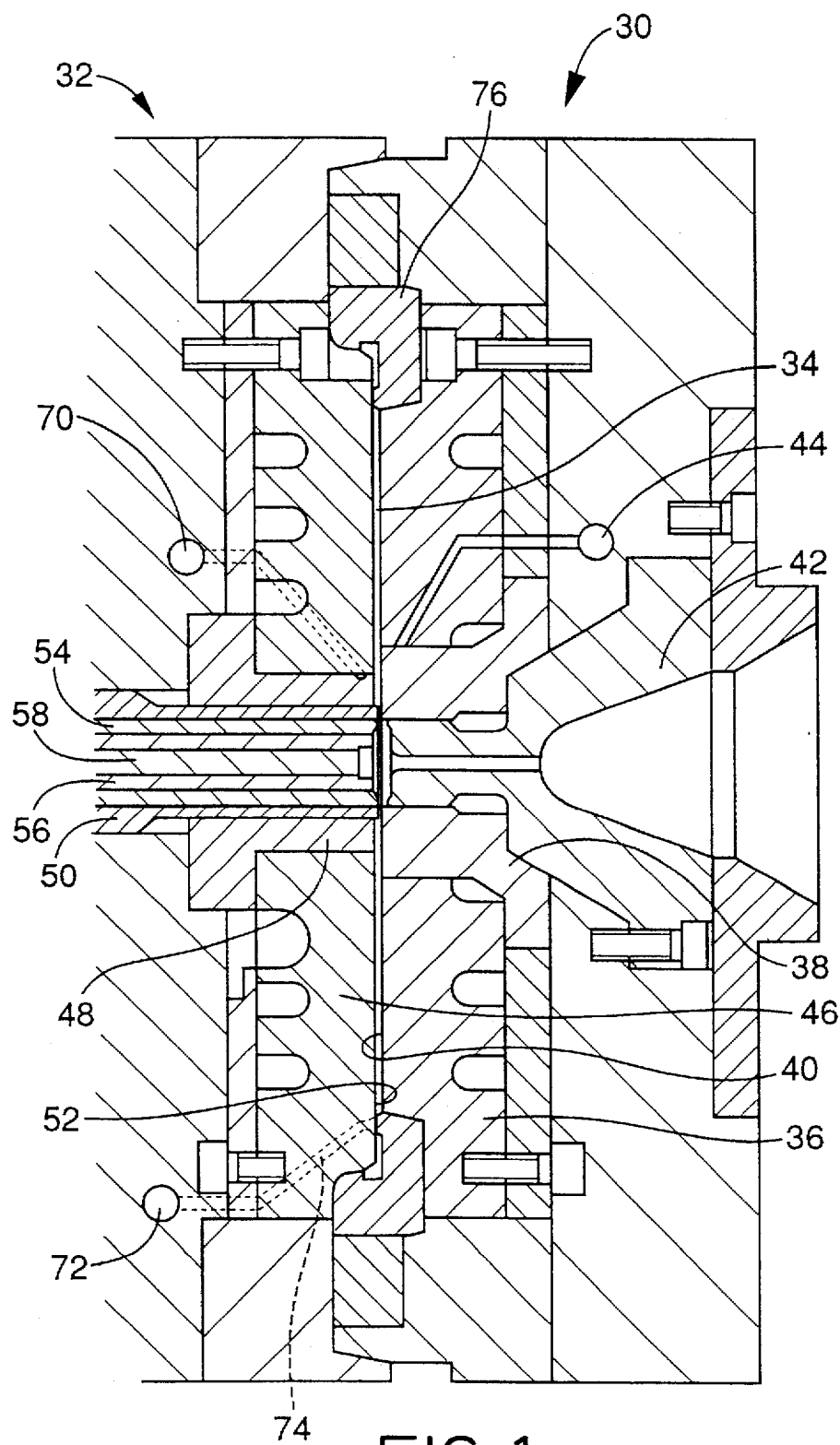
FIG. 1 is a fragmentary view in cross section of a mold constructed and used according to one embodiment of this invention for forming an optical disk substrate constructed according to one embodiment of this invention.

Referring first to FIG. 1, there is shown a mold for molding a substrate of an optical disk, which mold is constructed according to one preferred embodiment of the present invention. The mold has a stationary mold half 30 and a movable mold half 32. The stationary mold half 30 is attached to a stationary member of a mold clamping device (not shown), while the movable mold half 32 is attached to a movable member of the mold clamping device. The movable member of the mold clamping device is movable toward and away from the stationary member, so that the movable mold half 32 is movable toward and away from the stationary mold half 30. Thus, the mold has an open position and a closed position. In the closed position of FIG. 1 in which the stationary and movable mold halves 30, 32 are located closed to each other, there is defined a mold cavity 34 therebetween.

More specifically described, the stationary mold half 30 is provided with an annular stationary mirror block 36 having a major mirror surface which partially defines the mold cavity 34. An annular stationary insert sleeve 38 extends through and is fixed to a central portion of the annular stationary mirror block 36. Thus, the mirror surface of the stationary mirror block 36 and the corresponding axial end face of the stationary insert sleeve 38 cooperate to each other to define a first molding surface 40. The stationary insert sleeve 38 has a center bore in which is securely received a portion of a sprue bushing 42. The mold cavity 34 is filled with a resin material, which is injected into the mold cavity 34 through the sprue bushing 42 connected to a nozzle of an injecting device which is not shown in FIG. 1. To facilitate removal of the molded optical-disk substrate from the stationary mold half 30 upon opening of the mold halves 30, 32, a stream of compressed air is provided through a compressed air passage 44 in the stationary mold half 30, and is applied to the first molding surface 40 through a clearance or gap between the stationary mirror block 36 and the stationary insert sleeve 38.

One of the axially opposite end faces of the sprue bushing 42 which partly defines the mold cavity 34 is slightly recessed in the axially inward direction from the corresponding axially end face of the stationary insert sleeve 38. In this arrangement, an inner circumferential edge of the center bore of the stationary insert sleeve 38 functions as a female cutter for cutting a center hole in the molded disk substrate, in cooperation with a male cutter sleeve 54 which will be described.

The movable mold half 32 is provided with an annular movable mirror block 46 having a major mirror surface which partially defines the mold cavity 34. An annular movable insert sleeve 48 extends through and is fixed to a central portion of the movable mirror block 46. The movable insert sleeve 48 has a center bore through which an ejector sleeve 50 extends such that the ejector sleeve 50 is axially reciprocative. The mirror surface of the movable mirror block 46 and the corresponding axial end faces of the movable insert sleeve 48 and the ejector sleeve 50 cooperate with each other to define a second molding surface 52, which cooperates with the first molding surface 40 to define the mold cavity 34 when the mold is closed.

Figure 2:
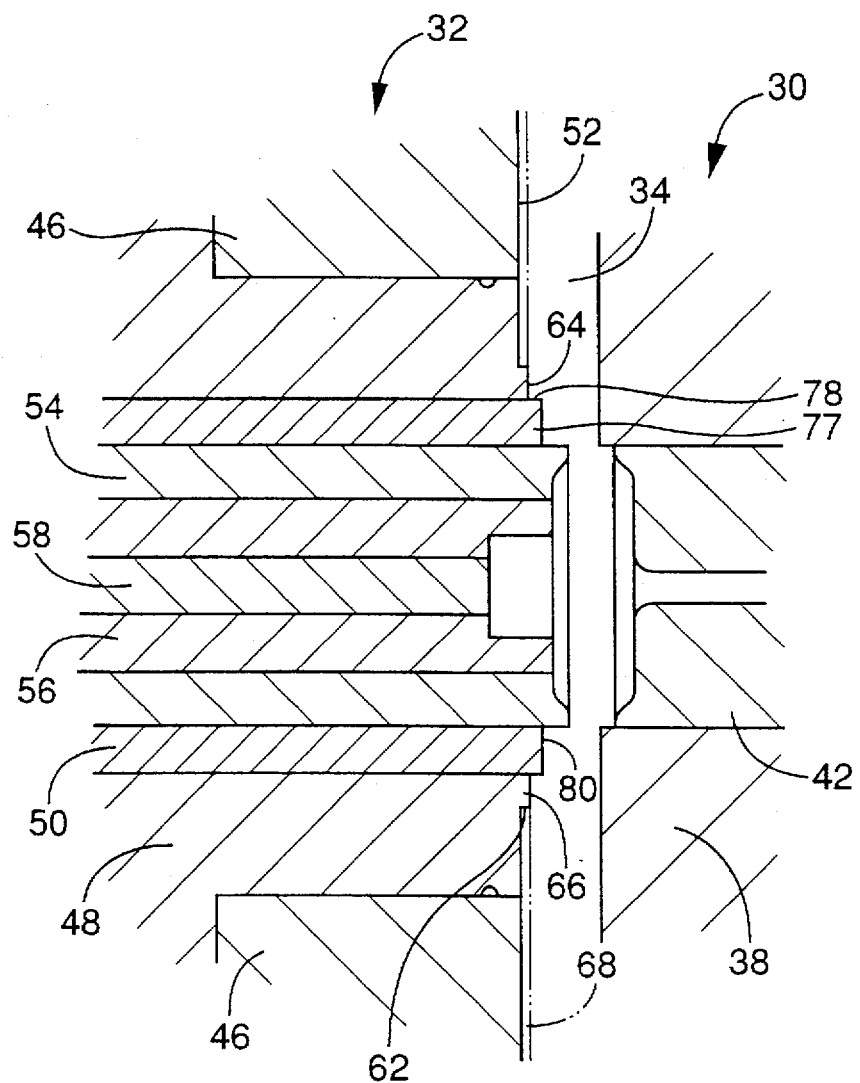
FIG. 2 is an enlarged view showing a part of the mold of FIG. 1.

As is apparent from FIG. 2 in which the central portion of the mold is shown in enlargement, the movable mold half 32 has the above-indicated male cutter sleeve 54 and an inner sleeve 56 in the central portion thereof, both of which are inserted through a center bore of the ejector sleeve 50 in the order of the description. An ejector pin 58 extends in its axial direction through the center bore of the inner sleeve 56. The axially inner ends of the male cutter sleeve 54, the inner sleeve 56 and the ejector pin 58 are located opposite to the axially inner end of the sprue bushing 42 of the stationary mold half 30, so that a runner for feeding the resin material injected through the sprue bushing 42 into the mold cavity 34 is defined by the opposed end faces of those elements 54, 56, 58, 42. After the mold cavity 34 is filled with the resin material, the male cutter sleeve 54 is advanced into the center bore of the stationary insert sleeve 38, whereby the center hole is cut in the molded disk substrate. After the injected resin material in the mold cavity 34 is cooled and then solidified, the mold is opened. Then, the ejector sleeve 50 and the ejector pin 58 are advanced from the second molding surface 52 toward the stationary mold half 30, whereby the molded disk substrate and the circular piece produced as a result of cutting the center hole in the formed substrate are removed from the movable mold half 32.

Figure 3:
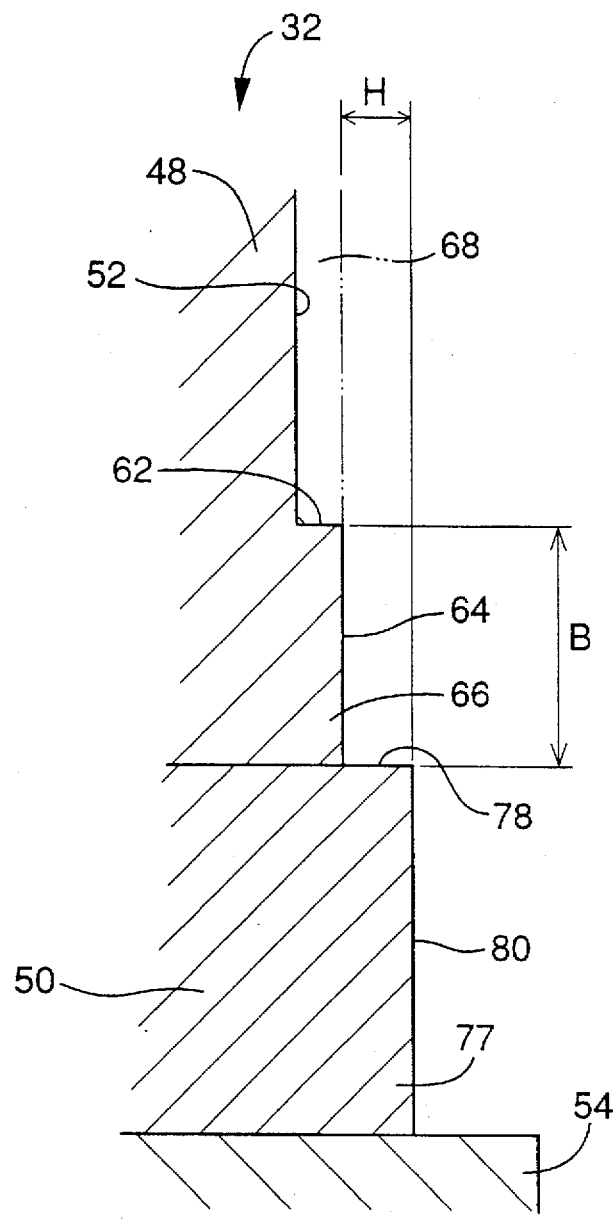
FIG. 3 is an enlarged view showing a part of a movable mold half of the mold of FIG. 1.

As shown in FIGS. 2 and 3, one of the axially opposite end portions of the movable insert sleeve 48 which partly defines the second molding surface 52 protrudes at a radially inner part thereof from the end face of the radially outer part toward the stationary mold half 30 over a predetermined axial length. This radially inner part of the movable insert sleeve 48 provides a positioning ring portion 66 having a predetermined wall thickness. An annular stamper 68 in the form of a relatively thin annular plate is placed on the second molding surface 52 of the movable mold half 32, such that the annular stamper 68 is fitted on at its inner circumferential edge on the an outer circumferential surface 62 of the positioning ring portion 66. The annular stamper 68 has an information-bearing surface on which is stored desired information in the form of submicrometer-sized projections or pits. Upon closing of the stationary mold half 30 and the movable mold half 32 together, the mold cavity 34 formed therebetween is filled with the resin material, which is injected from the sprue portion of the sprue bushing 42 into the mold cavity 34 through the above-indicated runner, so that a desired disk substrate is molded. That is, the information signals (projections or pits) stored on the information-bearing surface of the stamper 68 is copied onto or reproduced on the formed disk substrate. The thus produced disk substrate is subsequently processed into a disk which has a reflector film and a protective film, as described below.

Inside the movable mold half 32, there are formed suction passages 70, 72. A stream of vacuum air which is provided through the suction passages 70, 72 is supplied to a radially inner portion of the stamper 68 through a clearance or gap between the movable mirror block 46 and the movable insert sleeve 48, and is also supplied to a radially outer portion of the stamper 68 through a suction passage 74 formed through the movable mirror block 46. Thus, the stamper 68 is effectively attracted to the second molding surface 52 under suction of the vacuum air. To the outer peripheral portion of the movable mirror block 46, there is fixed a hook-shaped retainer ring 76 which also functions to hold the radially outer portion of the stamper 68 on the second mold surface 52.

As most clearly shown in FIG. 3, the positioning ring portion 66 is formed such that the end face 64 of the positioning ring portion 66 is substantially aligned or flush with the information-bearing surface of the stamper 68 positioned on the second mold surface 52. Namely, the axial dimension of the positioning ring portion 66 is substantially equal to the thickness of the stamper 68. The ejector sleeve 50 extends through the center bore of the movable insert sleeve 48 such that one of the opposite end portions of the ejector sleeve 50 which faces the stationary mold half 30 projects a suitable distance from the end face 64 of the positioning ring portion 66 when the ejector sleeve 50 is placed in its molding position. This axial end portion of the ejector sleeve 50 functions as a recessing end portion 77 having an outer circumferential surface 78 which is perpendicular to the end face 64 of the positioning protrude ring portion 66 of the movable insert sleeve 48. The recessing end portion 77 serves to form an annular recess 92 in the formed disk substrate, as described below in detail.

The recessing end portion 77 has an axial length or overhang H from the end face 64 of the positioning ring portion 66, as indicated in FIG. 3. The axial length H is not particularly limited, but is preferably 0.05 mm or larger. If the axial length H is excessively small, the formed disk substrate will not have a sufficiently high degree of quality, as is apparent from the following description. The edge of the outer circumferential surface 78 of the recessing end portion 77 of the ejector sleeve 50 may be chamfered or rounded. In this case, the axial length of the outer circumferential surface 78 except the chamfered or rounded edge portion is preferably 0.05 mm or larger. If the axial length H is excessively large, that is, if the amount of axial extension of the recessing end portion 77 of the ejector sleeve 50 into the mold cavity 34 is excessively large, the fluidity of the resin material into the mold cavity 34 is deteriorated. It is therefore desirable that the axial length H be 0.4 mm or smaller in view of the above fact and the standard thickness value of the optical disk. It is also desirable that an end face 80 of the recessing end portion 77 of the ejector sleeve 50 have a smooth flat surface for improved fluidity of the resin material into the mold cavity 34.

The positioning ring portion 66 has a radial dimension B, which is a distance between the outer circumferential surfaces 62 and 78 in the radial direction, as indicated in FIG. 3. The radial dimension B is suitably determined depending upon the inside diameter of the stamper 68, but is not particularly limited. However, if the radial dimension B which is excessively small may cause poor copying or reproduction of information of the stamper 68 onto the disk substrate, since a sufficient amount of the resin material injected into the mold cavity 34 may not reach the radially inner portion of the disk substrate in the presence of air remaining adjacent to the outer circumferential surface 78. In this respect, the radial dimension B is desirably 0.5 mm or larger.

Figure 4:
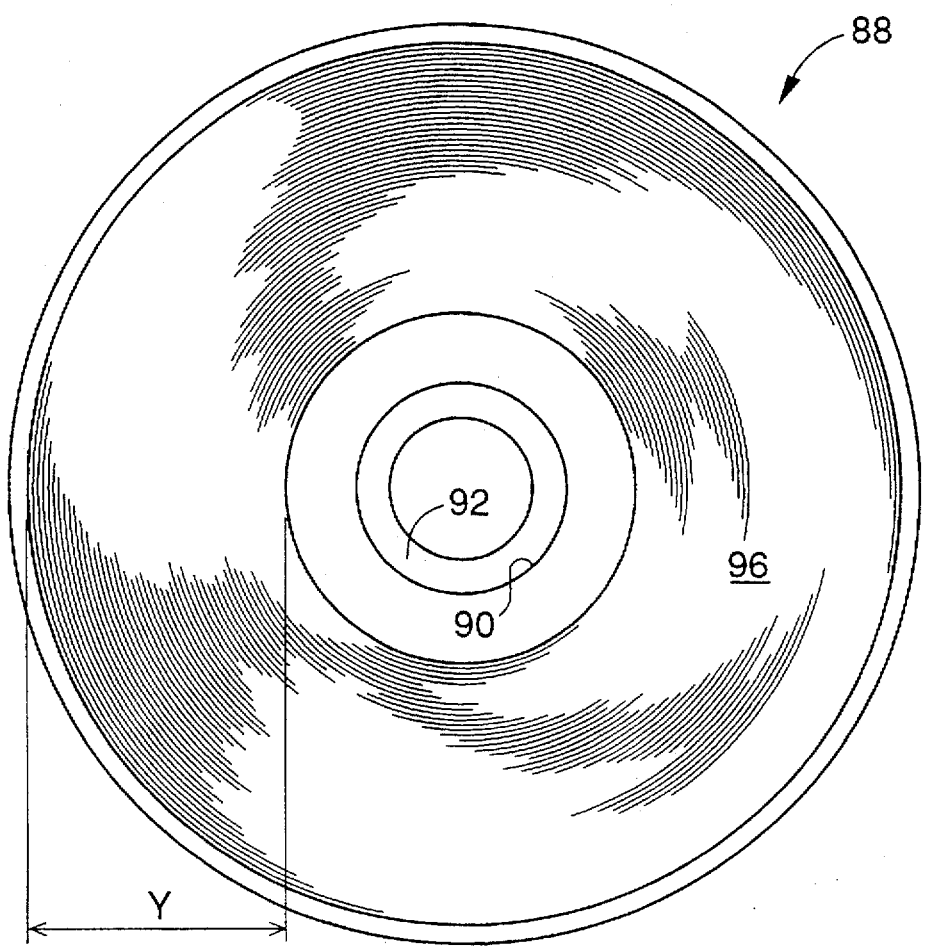
FIG. 4 is a plan view showing an example of a disk substrate according to the present invention and formed by the mold of FIG. 1.
Figure 5:
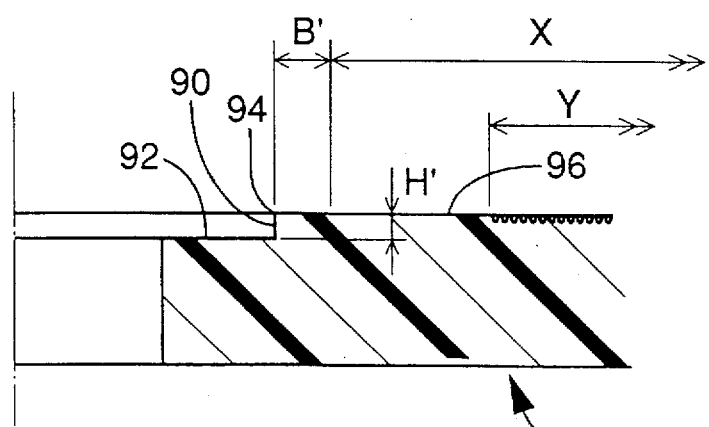
FIG. 5 is an enlarged view in cross section showing a part of the disk substrate of FIG. 4.

Referring next to FIGS. 4 and 5, there is shown the disk substrate which is formed by the mold having the movable mold half 32 whose ejector sleeve 50 is provided with the recessing end portion 77. The recessing end portion 77 having the outer circumferential surface 78 functions to form an annular recess 92 in the radially inner portion of the disk substrate 88. The annular recess 92 is partly defined by a circumferential shoulder surface 90, which is spaced from a stamper contact area X by a predetermined distance B' in the radially inward direction of the disk substrate 88. The annular recess 92 formed in the radially inner portion of the disk substrate 88 has a suitable depth H' with respect to an information-bearing surface 96 in the radially outer portion of the substrate 88. The stamper contact area X is the portion which has contacted with the information bearing surface of the stamper 68 during molding of the disk substrate 88. More specifically described, the stamper contact area X includes a signal area Y on which the information in the form of pits formed on the stamper 68 has been reproduced.

The configuration of the circumferential shoulder surface 90 formed in the disk substrate 88 corresponds to that of the outer circumferential surface 78 of the recessing end portion 77 provided in the movable mold half 32. Therefore, the shoulder surface 90 is formed in the disk substrate 88 such that the shoulder surface 90 is perpendicular to the top surface of the disk substrate 88. Namely, the shoulder surface 90 and the top surface of the substrate 88 define a substantially square. This square is formed by the end face 64 of the positioning ring portion 66 of the movable insert sleeve 48 and the outer circumferential surface 78 of the recessing end portion 77 of the ejector sleeve 50 inserted in the movable insert sleeve 48. Therefore, the shoulder surface 90 is formed with the substantially square edge 94 without chamfering or rounding.

Figure 6:
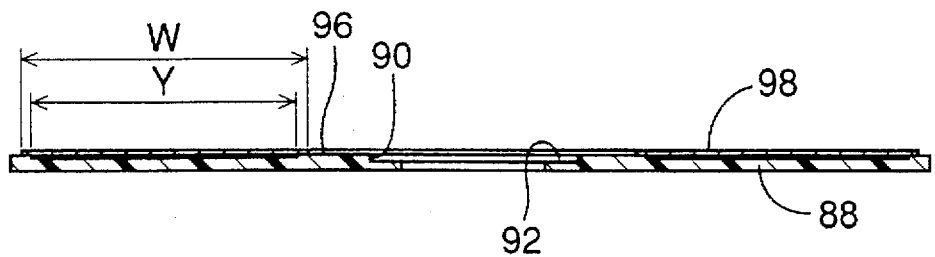
FIG. 6 is a cross sectional view of the disk substrate of FIG. 4, showing a process of forming a reflector film on the disk substrate.

The disk substrate 88 formed by molding as described above is subsequently pressed into a desired optical disk in such a manner as well known in the art. Initially, a reflector film 98 made of a thin film of pure aluminum or gold is formed by vapor deposition or sputtering on the information-bearing surface 96 of the disk substrate 88, namely, on the surface area within the stamper contact area X, as shown in FIG. 6, wherein W designates an area of the reflector film 98 which is large enough to cover the signal area Y.

Figure 7:
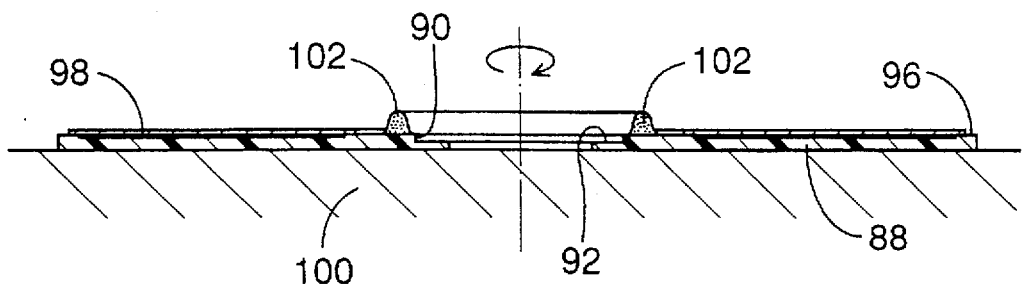
FIG. 7 is a cross sectional view of the disk substrate of FIG. 4 showing a first step of a process of forming a protective film on the disk substrate.
Figure 8:
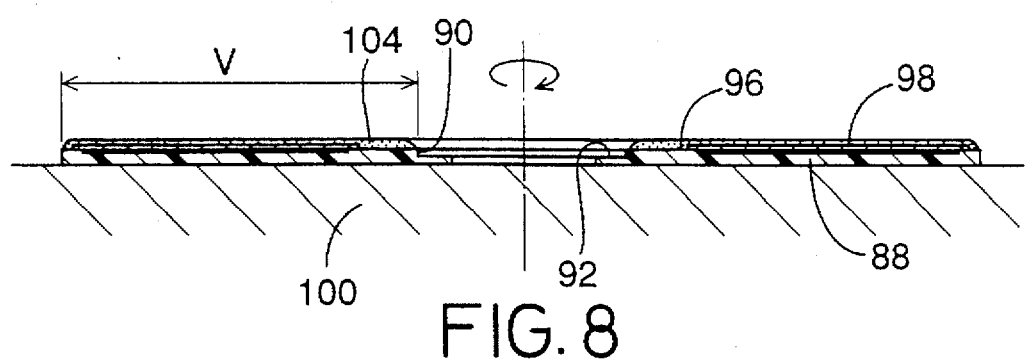
FIG. 8 is a cross sectional view of the disk substrate of FIG. 4, showing a second step of the process of FIG. 7.

The disk substrate 88 is then subjected to a process of forming a protective film 104 which protects the reflector film 98. As shown in FIG. 7, the disk substrate 88 is placed on and fixed to a rotating table 100 of a spin-coating device such that the center hole of the disk substrate 88 is aligned with the center shaft of the rotating table 100. Then, the rotating table is rotated at a relatively low speed while a material 102 of the protective film 104 is disposed on the disk substrate 88 through a nozzle disposed above the rotating table 100. Thus, the material 102 of the protective film 104 is disposed between the inner circumference of the reflector film 98 and the circumferential edge 94 of the shoulder surface 90, such that the material 102 of the protective film 104 assures an annular shape on the surface of the disk substrate 88.

Then, the rotating table 100 is rotated at a relatively high speed, so that the material 102 of the protective film 104 is spread radially outwardly over the reflector film 98 by a centrifugal force, whereby the protective film 104 is formed over the entire surface of the reflector film 98. While various kinds of synthetic resin materials may be employed for the material 102 of the protective film 104, a UV-curable synthetic material which is curable by exposure to a ultraviolet radiation may preferably be employed. If the UV-curable synthetic resin is used as the material 102, it is immediately cured by exposure to a ultraviolet radiation after it is spread over the reflector layer 98. Therefore, the reflector film 98 can be produced with high efficiency. An area V in which the protective film 104 is formed is generally determined such that the area V extends radially outwardly of the shoulder surface 90 on the disk substrate 88 so as to cover the entire area W of the reflector film 98.

Figure 9:
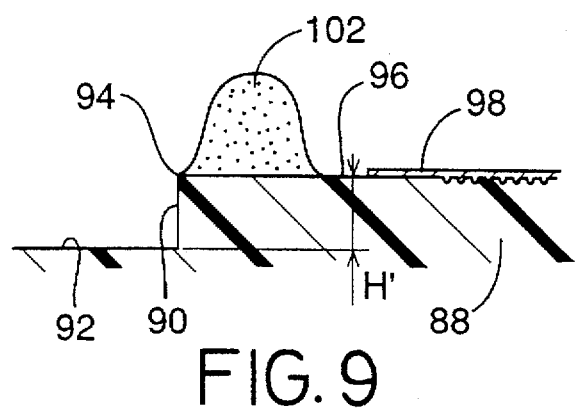
FIG. 9 is an enlarged view in cross section of a part of the disk substrate on which a material of the protective layer is provided.
Figure 10:
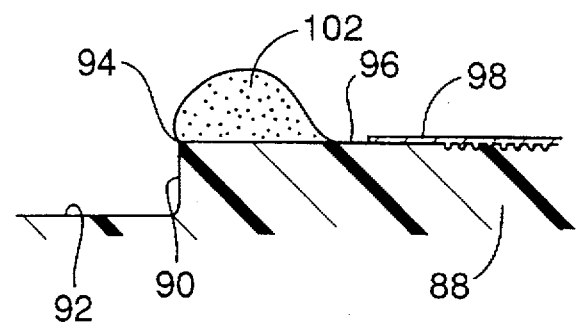
FIG. 10 is an enlarged view in cross section of a part of the disk substrate showing a shoulder surface formed on the substrate for preventing a radially inward movement of the material of the protective layer.

As is apparent from FIGS. 7 and 9, the circumferential shoulder surface 90 of the disk substrate 88 is disposed inside the annulus of the material 102 in the radial direction of the substrate 88. When the annular material 102 of the protective layer 104 is initially placed on the substrate 88, the material 102 may spread in the radially inward direction due to gravity or dislocation of the material 102 on the disk substrate 88. In this case, the angle of contact of the material 102 moving in the radially inward direction of the substrate 88 with respect to the information-bearing surface 96 of the disk substrate 88 is determined by a surface tension of the material 102 and a hysteresis of wetting of the surface 96. When the material 102 having a given surface tension reaches the edge 94, the contact angle of the material 102 with respect to the shoulder surface 90 is abruptly increased, since the surface 90 is at right angle with respect to the surface 96. As a result, a resistance to a radially inward movement of the material 102 increases, whereby the material 102 is effectively prevented from further spreading in the radially inward direction. In this respect, the material 102 of the protective layer 104 desirably has a viscosity of 20–30 cP to provide a desired surface tension and assure easy handling or treatment thereof.

To effectively prevent the radially inward movement of the material 102, the edge 94 should be sharp and should not be chamfered or rounded. Namely, if the edge 94 has a chamfer or roundness large enough to be visually perceived, the radially inward movement of the material 102 cannot be effectively prevented. Although it is not generally easy to form a completely square edge, the edge 94 having substantially squareness (an angle almost equal to 90 degrees) can be effectively and stably formed by using the movable mold half 32 wherein the ejector sleeve 50 has the recessing end portion 77 having the surface 78, which is perpendicular to the end face 64 of the positioning ring portion 66 and which functions to form the shoulder surface 90.

As is apparent from the above description of the present embodiment, when the protective layer 104 is suitably formed on the reflective layer 98 by the spin-coating device, such that radially inner periphery of the material 102 of the protective layer 104 is defined by the edge 94 of the circumferential shoulder surface 90, so that the protective layer 104 formed has a substantially annular configuration concentric with the annular recess 92. Accordingly, the optical disk 88 having a good appearance and a high quality can be produced with high stability.

The depth H' of the annular recess 92 (height dimension of the shoulder surface 90) corresponds to the axial dimension or overhang H of the recessing end portion 77. Therefore, the depth H' is preferably 0.05 mm or larger. If the depth H' is excessively small, the edge 94 is not effective enough to prevent the radially inward movement of the material 102 of the protective layer 104. Where the edge of the recessing end portion 77 is chamfered or rounded, the bottom corner of the recess 92 is accordingly chamfered or rounded. In this case, the depth H' is the effective depth of the recess 92 which does not includes the dimension of the chamfer or round, and the effective depth is preferably 0.05 mm or larger. If the depth H' is excessively large, the strength of the disk substrate 88 may not be sufficient. In view of the above and the existing standard of an optical disk, the depth H' is preferably 0.4 mm or smaller.

After the protective layer 104 is formed, the information-bearing surface 96 may be subjected to a printing operation such as a screen printing as needed, whereby a desired optical disk is obtained.

While the present invention has been described in detail in its presently preferred embodiment by reference to the accompanying drawings, for illustrative purpose only, it is to be understood that the invention is not limited to the details of the illustrated embodiment.

While the optical disk substrate and the mold for forming the optical disk substrate have been described in the illustrated embodiment, the present invention may be applied to a substrate of magneto-optic disk and a mold for forming the magneto-optic disk.

Figure 11:
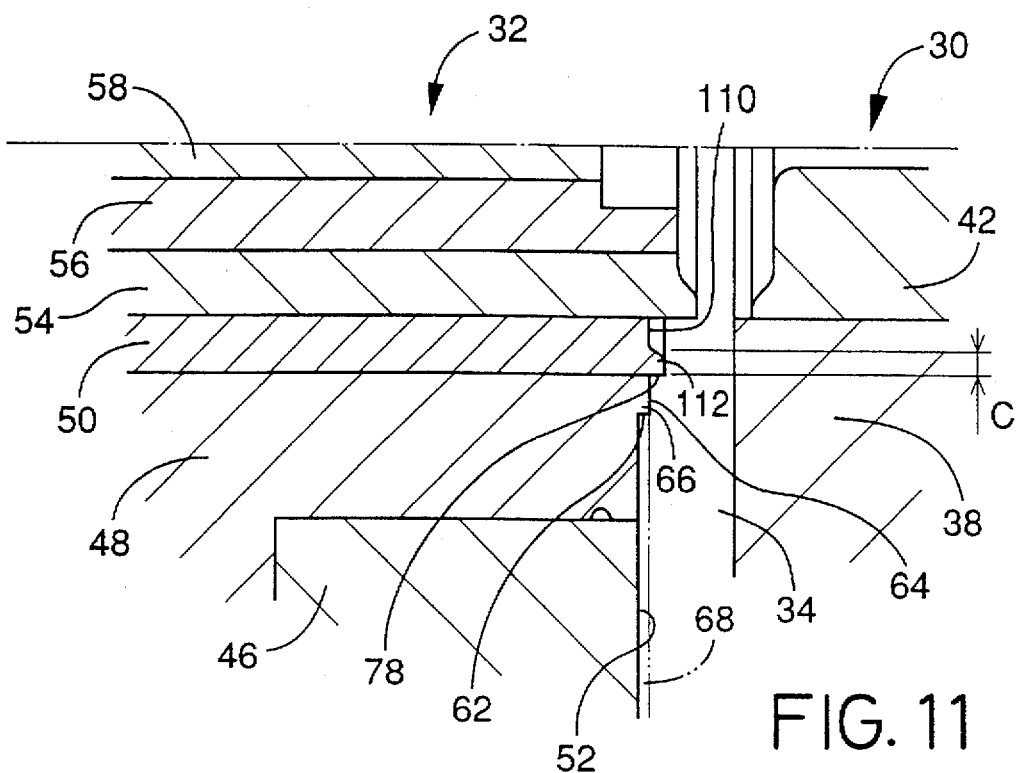
FIG. 11 is an enlarged view in cross section of a part of a mold constructed and used according to another embodiment of this invention for forming a disk substrate according to another embodiment of this invention.

In the illustrated embodiment, the end face 80 of the ejector sleeve 50 is a straight flat surface, and the recessing end portion 77 has the same wall thickness in the radial direction as the other portion of the ejector sleeve 50 so that the surface 78 has the same diameter as the outer circumferential surface of the other portion of the ejector sleeve. As illustrated in FIG. 11, the ejector sleeve 50 may have an axially protruding recessing ring portion 112 in a radially outer portion thereof and an annular recess 110 in a radially inner portion thereof. This recessing ring portion 112 has a smaller wall thickness in the radial direction than the other portion of the ejector sleeve 50. However, the diameter of the outer circumferential surface 78 is the same as that of the other portion of the sleeve 50. This arrangement having the recessing ring portion 112 partly defined by the annular recess 110 is preferably employed when the ejector sleeve 50 has a relatively large 10 wall thickness. If the bottom surface of the recess 110 is flush with the end face 64 of the positioning ring portion 66, the radially inner surface area of the molded disk substrate which corresponds to the bottom surface of the recess 110 is flush with the information-bearing surface of the substrate, and can therefore be easily printed when the information-bearing surface is subjected to a printing operation such as screen printing.

Where the ejector sleeve 50 has the axially recessing ring portion 112 only in its radially outer portion, the edge 94 may not be effective enough to prevent the radially inward movement of the material 102 of the protective layer 104, if the ring portion 112 has an excessively small wall thickness. Therefore, the wall thickness C of the ring portion 112 is desirably 0.05 mm or larger.

Figure 12:
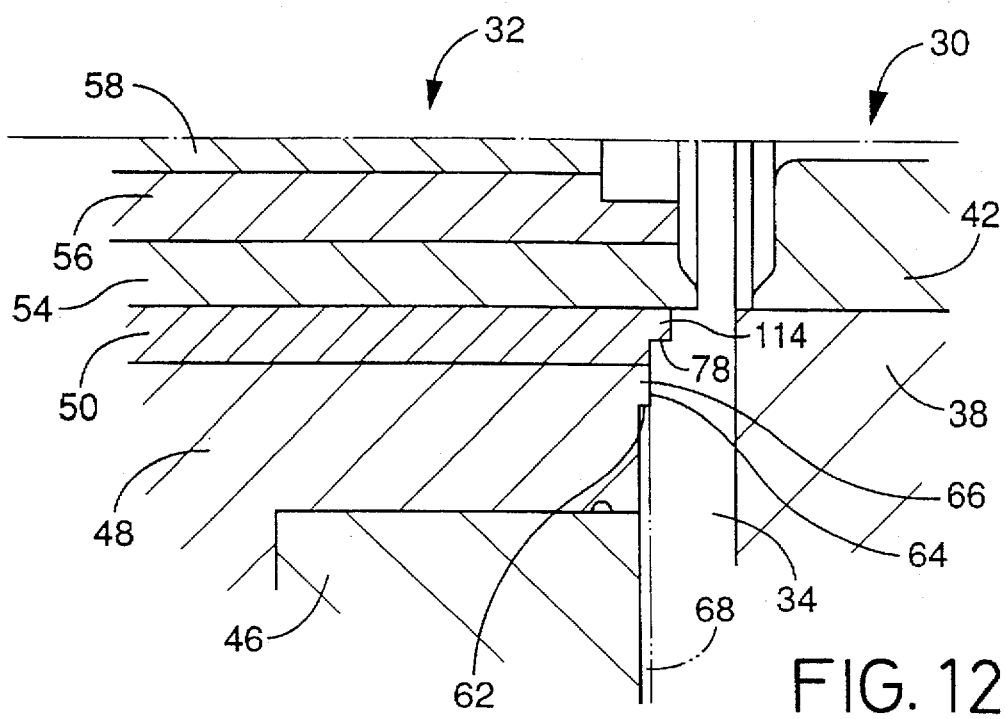
FIG. 12 is an enlarged view in cross section of a part of a further embodiment of a mold for forming a disk substrate according to this invention.
Figure 13:
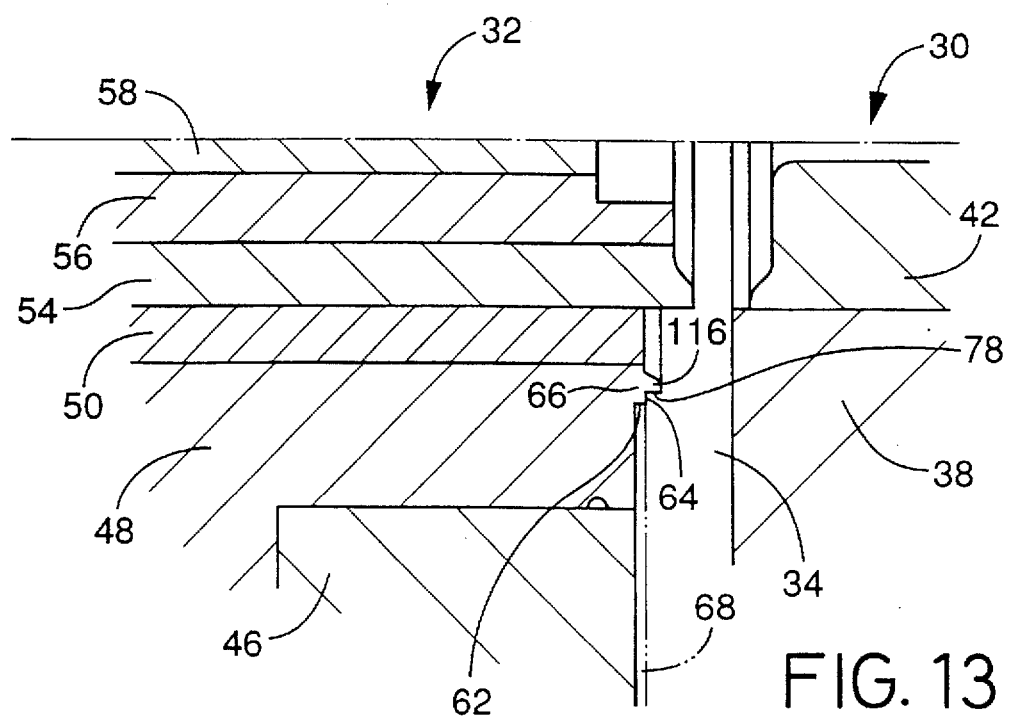
FIG. 13 is an enlarged view in cross section of a part of a still further embodiment of a mold for forming a disk substrate according to this invention.

The mold for molding the disk substrate constructed according to the present invention may be modified as needed. For example, the ejector sleeve 50 may have a recessing ring portion 114 whose outer circumferential surface 78 is located in a radially intermediate portion thereof, as illustrated in FIG. 12. This recessing ring portion 114 has a smaller wall thickness in the radial direction than the other portion of the ejector sleeve 50, and the surface 78 has a smaller diameter than the outer circumferential surface of the other portion of the ejector sleeve 50. Alternatively, the movable insert sleeve 48 may have a recessing ring portion 116 which extends from the end face 64 and which has the circumferential surface 78 in the radially intermediate portion. The circumferential surface 78 is located radially inwardly of the outer circumferential surface 62. Namely, the diameter of the surface 78 is smaller than the outside diameter of the positioning ring portion 66.

It is to be understand that the present invention may be embodied with various other changes, modifications and improvements, which may occur to those skilled in the art, in the light of the foregoing teachings, without departing from the spirit and scope of the invention defined in the following claims.

What is claimed is:

1. A mold for molding a substrate of a disk, said mold having an annular plate-like stamper which has a center hole and which contacts a surface of said substrate, said mold comprising:

a stationary mold half having a first mold surface;

a movable mold half movable relative to said stationary mold half and having a second mold surface which cooperates with said first mold surface to define therebetween a mold cavity when said stationary and movable mold halves are placed in a closed position for molding said substrate;

a positioning ring portion provided on said movable mold half, for positioning said annular stamper such that said annular stamper is fitted at said center hole on said positioning ring portion; and an ejector sleeve provided on said movable mold half such that said ejector sleeve is located radially inwardly of said positioning ring portion and is movable so as to protrude from said second mold surface for removing said substrate from said movable mold half, said ejector sleeve including a recessing end portion which extends in an axial direction thereof beyond an end face of said positioning ring portion into said mold cavity when said stationary and movable mold halves are placed in said closed position, said recessing end portion having an outer circumferential surface which is perpendicular to said end face of said positioning ring portion, whereby an annular recess partly defined by a circumferential shoulder surface is formed in the molded substrate by said outer circumferential surface of said recessing end portion of said ejector sleeve, said circumferential shoulder surface being formed by said outer circumferential surface of said recessing end portion.

2. A mold according to claim 1, wherein said recessing end portion has an axial length of 0.05 mm–0.4 mm as measured from said end face of said positioning ring portion in said axial direction.

3. A mold according to claim 1, wherein said outer circumferential surface of said recessing end portion of said ejector sleeve has a same diameter as an outer circumferential surface of a portion of said ejector sleeve other than said recessing end portion.

4. A mold according to claim 3, wherein said recessing end portion of said ejector sleeve has a same wall thickness in a radial direction thereof as a portion of said ejector sleeve other than said recessing end portion.

5. A mold according to claim 4, wherein said outer circumferential surface of said recessing end portion of said ejector sleeve has a same diameter as an outer circumferential surface of a portion of said ejector sleeve other than said recessing end portion.

6. A mold according to claim 4, wherein said outer circumferential surface of said recessing end portion of said ejector sleeve has a smaller diameter than an outer circumferential surface of a portion of said ejector sleeve other than said recessing end portion.

7. A mold for molding a substrate of a disk, said mold having an annular plate-like stamper which has a center hole and which contacts a surface of said substrate, said mold comprising:

a stationary mold half having a first mold surface;

a movable mold half movable relative to said stationary mold half and having a second mold surface which cooperates with said first mold surface to define therebetween a mold cavity when said stationary and movable mold halves are placed in a closed position for molding said substrate;

an insert sleeve provided on said movable mold half and including a positioning ring portion at one of opposite axial ends thereof on the side of said second mold surface, for positioning said annular stamper such that said annular stamper is fitted at said center hole on said positioning ring portion; and an ejector sleeve disposed radially inwardly of said insert sleeve and being movable so as to protrude from said second mold surface for removing said substrate from said movable mold half, said positioning ring portion of said insert sleeve including a recessing end portion which extends in an axial direction thereof beyond an end face of said positioning ring portion into said mold cavity when said stationary and movable mold halves are placed in said closed position, said recessing end portion having an outer circumferential surface which is perpendicular to said end face of said positioning ring portion, whereby an annular recess partly defined by a circumferential shoulder surface is formed in the molded substrate by said outer circumferential surface of said recessing end portion of said positioning ring portion, said circumferential shoulder surface being formed by said outer circumferential surface of said recessing end portion.

8. A mold according to claim 7, wherein said recessing end portion has an axial length of 0.05 mm–0.4 mm as measured from said end face of said positioning ring portion in said axial direction.

9. A mold according to claim 7, wherein said recessing end portion consists of an annular protrusion extending from said end face of said positioning ring portion in said axial direction.

10. A mold according to claim 7, wherein said outer circumferential surface of said recessing end portion has a diameter smaller than an outside diameter of said positioning ring portion.

* * * * *